I. ALLEGRETTI.

Improvement in Refrigerators.

No. 5,087. Reissued Oct. 8, 1872.

WITNESSES

L. R. Law

A. T. Gurlitz

INVENTOR

Ignazio Allegretti

UNITED STATES PATENT OFFICE.

IGNAZIO ALLEGRETTI, OF NEW YORK, N. Y., ASSIGNOR, BY MESNE ASSIGNMENTS, TO FRANCESCO FONTANO.

IMPROVEMENT IN REFRIGERATORS.

Specification forming part of Letters Patent No. 105,763, dated July 26, 1870; reissue No. 5,087, dated October 8, 1872.

*To all whom it may concern:*

Be it known that I, IGNAZIO ALLEGRETTI, now of the city and county and State of New York, formerly of the city and county of Philadelphia and State of Pennsylvania, have invented certain new and useful Improvements in Refrigerators, or structures for preserving perishable articles; and I do hereby declare that the following is a full, clear, and exact description thereof, and of their construction and operation, reference being had to the accompanying drawing and to the letters of reference marked thereon and making a part of this specification.

The object of my invention is the construction of a refrigerator or structure for keeping cool, and thereby preserving, perishable articles, whereby an intense degree of cold can be produced when desired, so that perishable articles placed in it can be retained even in a frozen state, and water can be frozen and become solid ice. The refrigerator can thus be made to form its own ice, after being once filled, and can be so regulated that the quantity of ice produced will be sufficient for daily consumption, and to supply the necessary amount to retain an uniform low temperature. This improved refrigerator is so constructed that the ice or cooling-mixture, and cold air therefrom, wholly or substantially surrounds the entire chamber in which the articles to be preserved are placed, and access is had to such chamber without exposing the ice or cooling-material to the air, thereby securing a more uniform temperature, and causing the ice to last much longer without melting; and such chamber is also so arranged that it can be readily removed at any time for the purpose of cleansing it, or for any other purposes.

Figure 1:
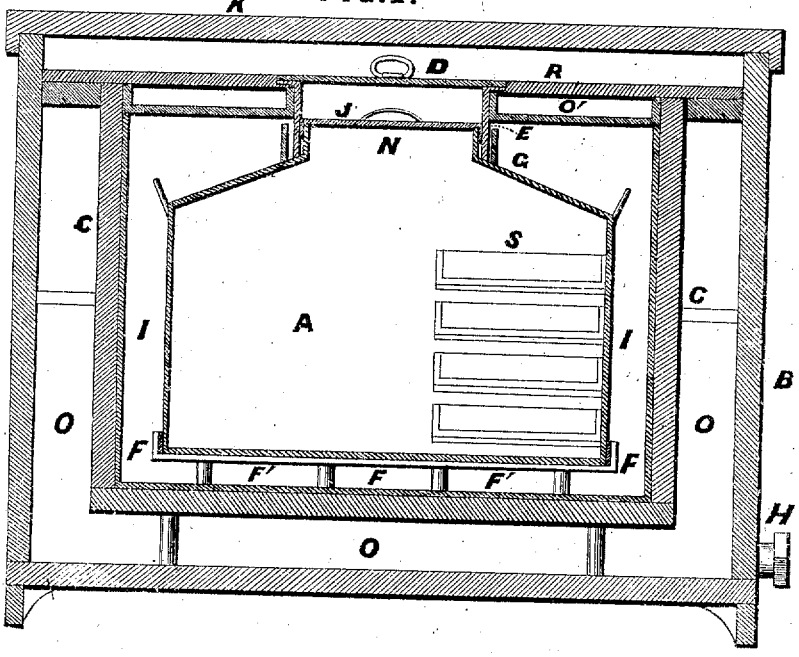
Figure 2:
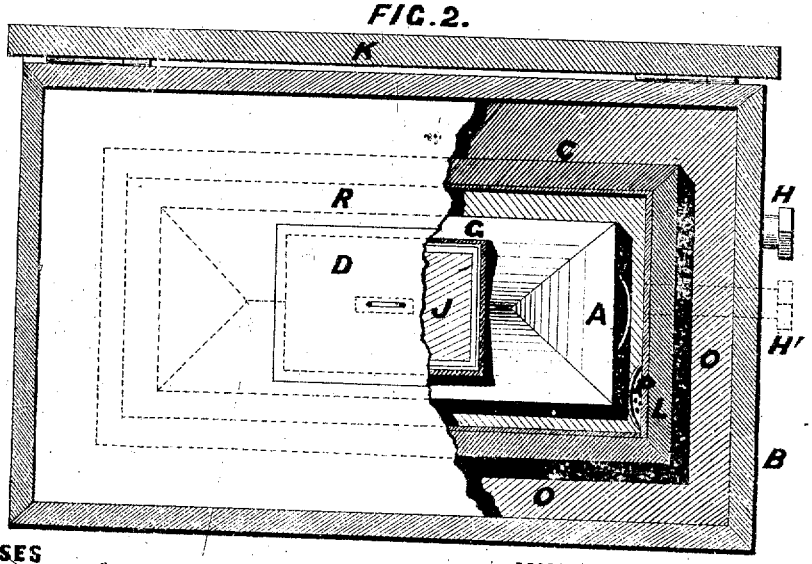

Figure 1 is a vertical section of my improved refrigerator. Fig. 2 is a top view of the same, with the outer cover opened, and a portion of the inner cover broken away in order to show the interior.

The refrigerator consists of a metallic chamber, A, made in any suitable form, and in separate compartments when desired, and may also be fitted or provided, in its interior, with a series of shelves, S, placed one above another. Such metallic chamber is placed in the interior of a metal-lined or other case, C, and is supported therein on a frame, F, which raises the metallic chamber above the bottom of the case C—the case C being made somewhat larger than the inclosed metallic one, so as to form an ice-space, I, above and on the sides of such metallic chamber, and a cold-air chamber, F′, below it. The frame F is preferably made of slats, or open, so as to expose the bottom of the chamber A to the action of the cooling or freezing material placed around such chamber. The case C is inclosed in an outer casing or box, B, of larger dimensions, having an intervening space, O, between the two, which may be filled with any non-conducting material, or allowed to remain vacant or unfilled, so as to permit a free circulation of air. Resting on the upper edge of the case C and fitting closely against the inner sides of the box B is a cover, R, having an opening in the center, in and around which opening is fitted a metallic or wooden frame, E, which extends downward to and rests upon the top of the chamber A, and the opening in the top of such cover, and within the frame E, is closed by means of the cover D. Such cover R around the frame E may also be constructed with an intervening space, O′, which, like the space O, may be filled with any non-conducting material, or left as an air-chamber. The metallic chamber A is provided with an opening, N, in its upper part or side, fitted with a cover, J, which shuts or passes down against the sides of the frame E, and should fit perfectly air-tight over such opening. This part of the chamber A may be also provided with a rim or flange, G, surrounding the frame E, which assists in forming a tight joint for such frame, allows for the passage of any water which may accumulate on the outside of the cover J, and more effectually protects the ice in the chamber or space I.

By the arrangement of the frame E as above described, the covers D and J may be removed without exposing the ice placed in the space I to the exterior or warmer atmosphere, thereby causing the ice to last much longer, and also securing a more uniform temperature in the chamber A. If desired, an opening to the chamber A can be made in the side instead of on top of the refrigerator, and inclosed or fitted in the same manner with the frame E and covers J and D. In such case these covers would form a door or doors, and would be supported on hinges. The ice could be deposited through suitable openings in the top. The joints in the covers are made air-tight by means of flannel or rubber strips placed around their edges.

In the lower part of the case C is formed an opening, L, which communicates with the space O, and is covered with a perforated plate, P, made so as to be easily removed for the purpose of cleansing it or opening the perforations. Such opening is used when the the space O remains unfilled, and allows the water produced by the melting of the ice to pass into the lower part of it, from whence it is drawn off, as required, through the pipe H secured in the box B, such pipe being supplied with a screw-cap, cock, or any suitable device. When the space O is filled a pipe, H′, is passed from the outside of the box B, and connects with the ice-space I, so that the waste water will pass through it. The top of the box B may be closed by means of a tight-fitting cover, K, which may have an opening made in it directly over the inner cover D, so that communication may be had with the interior of the chamber A without raising such cover K. The metallic chamber A rests upon but is not fixed to the frame E or within the case C, so that the former can be at any time lifted and taken out of the case C, for convenience in cleansing, &c. The cover R and frame E are also so constructed and arranged as to be capable of being removed at pleasure, one or both, for convenience in filling the ice-space I or to permit the chamber A to be removed for any purposes required.

The operation or mode of use of the refrigerator is as follows: Provisions, fruits, confections, and other perishable articles are placed in the interior of the metallic chamber A, (and, when necessary or desired, separate compartments may be provided therein for such purpose,) the space I between such chamber and the case C filled with ice, or ice and salt, so that the entire surface of the chamber A will be exposed to their action, thereby producing a very low temperature in the interior of such chamber, which can be made to freeze the articles placed therein, and if water is placed in pans on the shelves S it will be frozen into solid ice.

If it is desired to produce an intense degree of cold in a very short time chemicals are employed in combination with the ice and salt, and, on the other hand, such space may be filled with ice alone, if desired.

By removing the cover R and frame E the metallic chamber A may be removed from the case C, so as to permit the refrigerator to be cleansed or repaired, when they can again be replaced and the refrigerator be prepared for use. By the arrangement of the metallic chamber A within the case C, substantially as described, whereby such chamber is surrounded on the top and on the sides with an ice space or chamber for the cooling or freezing mixture, and having a cold-air chamber below the same, and protecting such ice-space and cold-air chamber from exposure to the air, when the chamber A is opened or access had thereto, the degree of cold can be graduated and regulated with great uniformity, and as desired. With the use of ice alone a temperature ranging from 40° down to about the freezing-point can be continuously secured, and by a mixture of salt and ice a temperature 10° below zero can be attained, while by the additional use of chemicals a still lower temperature can be produced and continued as found necessary. The most perishable articles—as fruits—can thus be preserved for months, if desired.

To attain the greatest and most effective degree of cold the space below the metallic chamber A should be filled with the cold air, and not with water, provision for the escape of which is secured by the pipes H or H′.

What is claimed as new is—

1. In a refrigerating structure, the combination of an inner metallic chamber for containing the articles to be preserved with an inclosing-case, the two so arranged that there shall be ice chamber or space above and around, and cold-air space below, such inner chamber, and having a close, tight frame around the opening to such inner chamber to admit access thereto without exposing such ice or cold-air space to the external air, for the purposes set forth.

2. In a refrigerating structure, the arrangement of the close frame E, in combination with the flange G, substantially as and for the purposes set forth.

3. In a refrigerating structure, the combination and arrangement of the inner or preserving chamber, with its inclosing-case, so that there shall be ice-space above and around the former, and a cold-air chamber below it, for the purposes set forth.

4. In a refrigerating structure, the arrangement of the inner or preserving chamber and its supporting-frame, substantially as described, in combination with such a construction of the inclosing-case as will permit the former to be removed without injury to itself or its inclosing-case, for the purposes set forth.

5. The inner chamber A, provided with cover J to its opening N, in combination with the inclosing-case C, fitted with covers R and D, and with the frame E and flange G, around the opening of the inner chamber and frame F, for supporting such inner chamber in the inclosing-case, all arranged substantially as described, to secure ice and cold-air space around and below such inner chamber, and permit access thereto without exposing such ice and cold-air space to the external air, for the purposes set forth.

6. In combination with the inner chamber A and inclosing-case, the outer box B, provided with cover K, as and for the purposes set forth.

IGNAZIO ALLEGRETTI.

Witnesses:
S. D. LAW,
A. T. GURLITZ.